United States Patent
Liang et al.

(10) Patent No.: US 11,321,081 B2
(45) Date of Patent: May 3, 2022

(54) AFFINITY RECOMMENDATION IN SOFTWARE LIFECYCLE MANAGEMENT

(71) Applicant: INTERNATIONAL BUSINESS MACHINES CORPORATION, Armonk, NY (US)

(72) Inventors: Lu Liang, Beijing (CN); Zhi Qiang Sun, Beijing (CN); Brian C. Schimpf, Harvard, MA (US); Yuhong Yin, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1730 days.

(21) Appl. No.: 13/682,308

(22) Filed: Nov. 20, 2012

(65) Prior Publication Data
US 2014/0143756 A1      May 22, 2014

(51) Int. Cl.
G06F 9/44      (2018.01)
G06F 8/70      (2018.01)
G06F 8/36      (2018.01)

(52) U.S. Cl.
CPC . G06F 8/70 (2013.01); G06F 8/36 (2013.01)

(58) Field of Classification Search
CPC ....... G06F 8/71; G06F 11/366; G06F 11/3616
See application file for complete search history.

(56) References Cited

U.S. PATENT DOCUMENTS

| | | | | |
|---|---|---|---|---|
| 2005/0223354 A1* | 10/2005 | Drissi et al. | | 717/114 |
| 2005/0262482 A1* | 11/2005 | Wagner | | G06F 8/71 |
| | | | | 717/120 |
| 2006/0123389 A1* | 6/2006 | Kolawa | | G06F 11/3616 |
| | | | | 717/101 |
| 2008/0127089 A1* | 5/2008 | Peretz | | G06F 8/71 |
| | | | | 717/122 |
| 2008/0141214 A1* | 6/2008 | Olson | | G06Q 10/06 |
| | | | | 717/101 |
| 2008/0222501 A1* | 9/2008 | Travison | | G06F 11/366 |
| | | | | 714/819 |
| 2009/0327809 A1 | 12/2009 | Joy et al. | | |
| 2010/0011337 A1* | 1/2010 | Young | | G06F 8/70 |
| | | | | 717/104 |
| 2011/0161913 A1* | 6/2011 | Garimella | | G06F 8/10 |
| | | | | 717/101 |
| 2011/0252394 A1 | 10/2011 | Sharma et al. | | |
| 2013/0311968 A1* | 11/2013 | Sharma | | G06Q 10/06 |
| | | | | 717/101 |

* cited by examiner

*Primary Examiner* — Chat C Do
*Assistant Examiner* — Lenin Paulino
(74) *Attorney, Agent, or Firm* — Cuenot, Forsythe & Kim, LLC

(57) ABSTRACT

Software lifecycle management includes, searching, using a processor, historical development data including prior development tasks for a software system. The searching is performed according to a current development task for the software system. A determination is made as to whether the current development task has an affinity with a selected prior development task implemented within the software system. A recommendation is provided for the current development task based upon the selected prior development task.

20 Claims, 3 Drawing Sheets

AFFINITY RECOMMENDATION IN SOFTWARE LIFECYCLE MANAGEMENT

BACKGROUND

Most modern software systems are large and complex—often having multiple layers that interact with one another. The software system is developed and maintained over a multi-year time span. In many cases, the lifecycle of a software system continues beyond the time that any one individual developer or tester is assigned to work on and/or support the software system. Developers and testers new to supporting and/or developing the software system need time to become familiar with the code base of the software system.

When making a change to the software system, it can be difficult for a developer or tester to determine which activities of the software development process may be affected by the particular changes that are to be made. Often, a developer's only way of gaining insight is to seek the advice of one or more other developers that have more experience with the software system.

BRIEF SUMMARY

A method of software lifecycle management includes searching, using a processor, historical development data including prior development tasks for a software system. The searching is performed according to a current development task for the software system. The method further includes determining that the current development task has an affinity with a selected prior development task implemented within the software system and providing a recommendation for the current development task based upon the selected prior development task.

A system for software lifecycle management includes a processor programmed to initiate executable operations. The executable operations include searching historical development data including prior development tasks for a software system. The searching is performed according to a current development task for the software system. The executable operations further include determining that the current development task has an affinity with a selected prior development task implemented within the software system and providing a recommendation for the current development task based upon the selected prior development task.

A computer program product for lifecycle management includes a computer readable storage medium having program code embodied therewith. The program code is executable by a processor to perform operations. The operations include searching, using the processor, historical development data including prior development tasks for a software system. The searching is performed according to a current development task for the software system. The operations further include determining, using the processor, that the current development task has an affinity with a selected prior development task implemented within the software system and providing, using the processor, a recommendation for the current development task based upon the selected prior development task.

DETAILED DESCRIPTION

Figure 1:
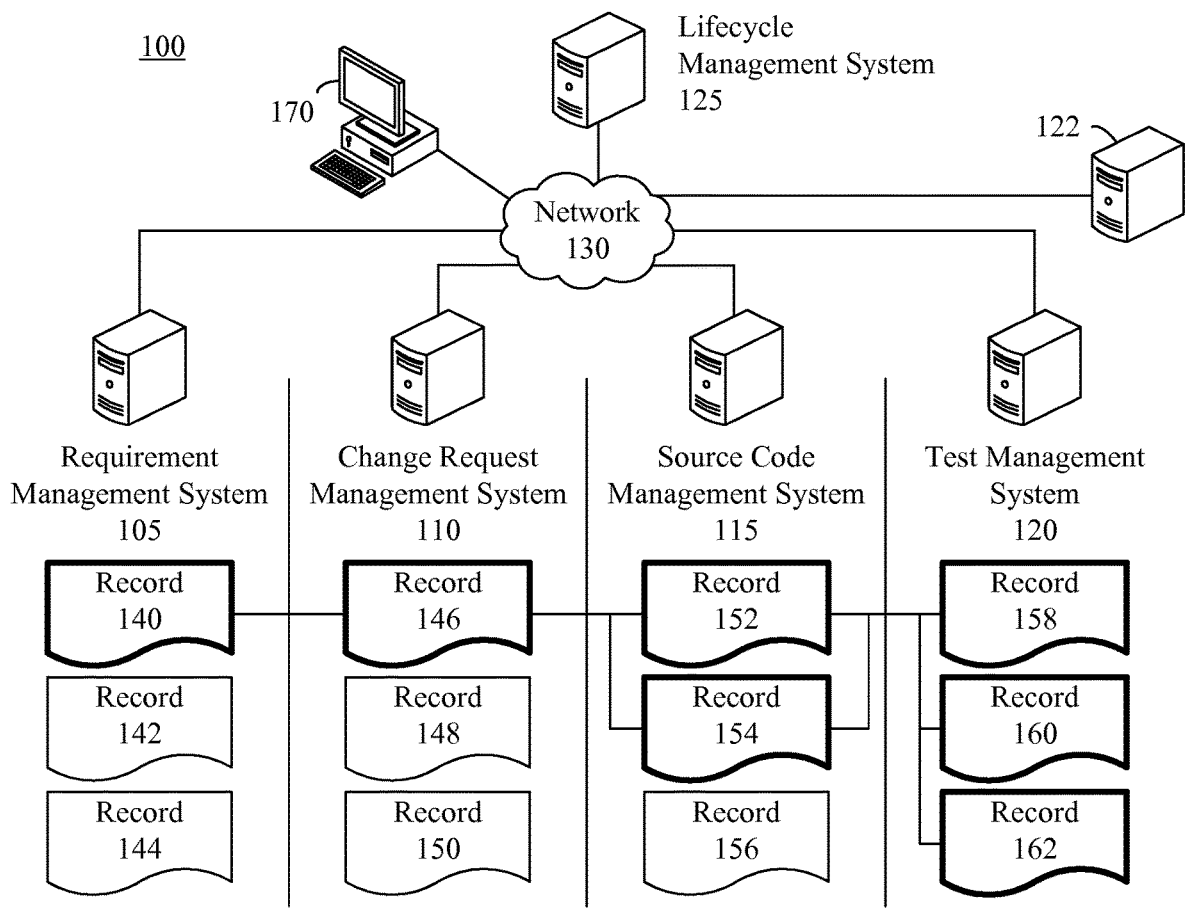
FIG. 1 is an exemplary computing environment for software lifecycle management.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium refers to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments relate to software lifecycle management and, more particularly, to providing recommendations based upon an affinity of a change to be made to a software system with prior changes implemented upon the software system. In accordance with the inventive arrangements disclosed within this specification, a current change to a software system under development or being maintained can be identified. The current change can be used to query against historical development data to locate one or more prior changes to the software system that has an affinity with the current change to be implemented. An "affinity" is a likeness based on a specified relationship or a causal connection. A recommendation relating to the current change can be provided to the developer based upon the particular historical development data that is located by the search. As such, the developer is made aware of any prior issues that may have occurred when changes considered similar to the current change were implemented on the software system.

FIG. 1 is an exemplary computing environment 100 for software lifecycle management. Computing environment 100 include various management systems, e.g., development management systems, configured for managing development data for one or more software systems under development or being maintained. Managing software development data can include creating, storing, deleting, and/or updating various types of records relating to development and/or maintenance of a software system. Examples of management systems pictured in computing environment 100 include a requirement management system 105, a change request management system 110, a source code management system 115, and a test management system 120. One or more additional management systems can be included as exemplified by system 122. Computing environment 100 further includes a life cycle management system 125.

Each of the various systems noted, i.e., systems 105, 110, 115, 120, 122, and 125, is communicatively linked through network 130. Network 130 can be implemented as, or include, any of a variety of different networks such as a WAN, a LAN, a wireless network, a mobile network, a Virtual Private Network (VPN), the Internet, or the like.

Requirement management system 105 is a data processing system executing suitable operational software, e.g., program code, that programs the data processing system to manage requirements that are generated for one or more software systems over time. Using requirement management system 105, users can create requirements that are then stored. Further, users may update the status of requirements, modify requirements, or the like. Records 140, 142, and 144 are examples of requirements that are managed by requirement management system 105.

A "requirement" is an electronic document, e.g., a file, including a description of a feature that is to be added, modified, or deleted from a software system. A requirement can originate from any of a variety of sources including, but not limited to, detection of an error, a desire to implement a new feature, a need to change or expand an existing feature (e.g., fix a defect), the need to remove a feature, changes to the structure of the software system, or the like. The requirement can include one or more use cases, non-functional requirements, or the like. A use case describes interactions between an actor (e.g., a user or another system).

Change request management system 110 is a data processing system executing suitable operational software that programs the data processing system to manage change requests that are generated for one or more software systems over time. Using change request management system 110, users can create change requests that are then stored. Users also may update the status of change requests, modify change requests, etc. In one example, each change request can be linked or associated with one or more corresponding requirements within the requirement management system. Records 146, 148, and 150 are examples of change requests managed by change request management system 110.

A "change request" refers to a document, e.g., a file, providing a more formal description of a requirement. The change request describes the particular changes to be made to the software system in order to implement the requirement. A change request is more formal in that the change request specifies the particular portions, e.g., components, of the software system affected by a requirement. A "component" of a software system refers to a file, whether a configuration file or a source code file, a module, a group of files forming a subsystem, or the like. A change request is one example of a "development task" or "task" as used within this specification.

Source code management system 115 is a data processing system executing suitable operational software that programs the data processing system to manage components, e.g., source code, of one or more software systems over time, e.g., over the lifecycle of the software systems. Source code management system 115, for example, can perform functions such as managing different versions of source code for the software system, tracking source code for different builds of various versions of the software system, tracking different versions of components of the software system, or the like. Records 152, 154, and 156 are examples of records and corresponding components of a software system managed by source code management system 115.

A "software system" refers to a collection of one or more intercommunicating components that are executable by a data processing system. As noted, components of a software system include source code files including configuration files, modules within the source code files, or the like. Further examples of components can include, but are not limited to, programs, scripts, and/or other programmatic material that is executable or used by a data processing system in executing a software system.

In one aspect, source code management system 115, in managing different versions of components of a software system that are used to create one or more builds of the software system, tracks change sets. A "change set" refers to a group of one or more components that include changes compared to a prior version or a different version of the component(s). The changes typically are made or initiated by a developer in response to a change request. A more specific example of a change set includes one or more source code files, etc., that have been modified by a developer to implement a change request. The change set is a deliverable that is provided from the developer to source code management system 115 for use in creating a build of a software system. Records 152-156 further can represent change sets introduced by the software system over time. A change set is another example of a development task.

Test management system 120 is a data processing system executing suitable operational software that programs the data processing system to manage tests, which can include test results, e.g., errors or issues, for one or more software systems over time. The test management system can store tests, e.g., test plans, test cases, defect reports, functional tests, non-functional tests, regression tests, etc., for one or more different software systems. Each of the tests stored within the test management system can be linked to, or associated with, one or more change requests within change request management system 110, one or more requirements within requirement management system 105, and/or one or more source code files within source code management system 115. Records 158, 160, and 162 are examples of tests and/or corresponding test results that are stored and managed within test management system 120.

System 122 is a data processing system executing suitable operational software that programs the data processing system to manage records relating to one or more other development activities that can be linked to the records of the aforementioned management systems.

As pictured in FIG. 1, one or more records among the various management systems are linked or otherwise associated with one another. For example, record 140, representing a requirement, is linked to record 146 representing a change request that is generated to implement the requirement. Record 146 is, in turn, linked to change sets represented by records 152 and 154, which implement the actual change request represented by record 146. Records 158, 160, and 162 represent testing activities and/or results that are linked with the change sets represented by records 152 and 154.

Lifecycle management system 125 is a data processing system executing suitable operational software that programs the data processing system to perform the various executable operations described within this specification. Lifecycle management system 125 is programmed to query, e.g., search, management systems 105, 110, 115, 120, and/or 122 for particular records, collectively referred to as "historical development data" for a specified software system. The searching determines whether prior changes to a software system as documented within the historical development data have an affinity with a current change that is to be made. The current change may not have been made. In another example, the current change may have been implemented in that the change is performed within a change set. The change set, however, may not yet be integrated into a build of the software system so as to avoid the introduction of an error prior to obtaining a recommendation as described within this specification.

By locating one or more prior changes that do have an affinity with the current change, the developer responsible for the current change can obtain valuable information relating to any problems or issues that may arise or that may be expected based upon the prior changes that were implemented. Rather than awaiting an error resulting from the current change, the developer is provided with a recommendation before an error occurs. The searching and providing of a recommendation from lifecycle management system 125 is provided responsive to one or more triggers that occur prior to the incorporation of a change set implementing the current change into a build of the software system (e.g., compilation of the change set with the remainder of the software system).

In one aspect, the triggers described relate to activities performed by a developer working through data processing system 170 or other suitable system. Examples of triggers include a developer initiating a search manually from data processing system 170 or a user, e.g., a developer or tester, performing one or more operations within one or more of the management systems to be described herein in further detail.

The various management systems 105, 110, 115, 120, 122, and 125 are illustrated as separate and individual data processing systems for purposes of illustration. In another example, one or more of the data processing systems pictured can represent a plurality of interconnected data processing system, e.g., a cluster. In still another example, two or more of the management systems can be implemented within a single data processing system or within a single group of interconnected data processing systems. The embodiments disclosed within this specification are not intended to be limited to the particular architecture shown.

Figure 2:
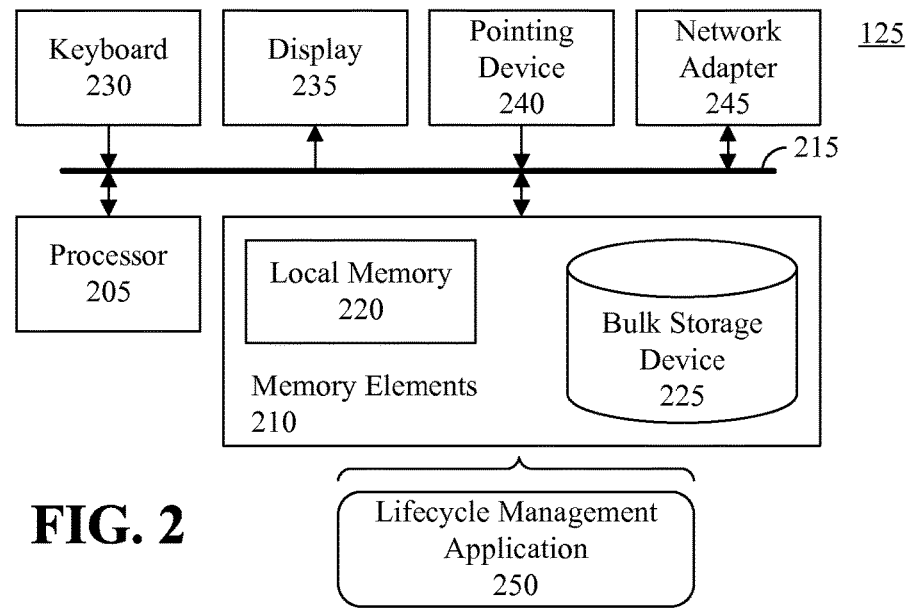
FIG. 2 is an exemplary implementation of the lifecycle management system described with reference to FIG. 1.

FIG. 2 is an exemplary implementation of lifecycle management system 125 (system 125) of FIG. 1. It should be appreciated that the architecture illustrated in FIG. 2 also can be used to implement one or more or all of the management systems, e.g., systems 105, 110, 115, 120, and/or 122.

System 125 can include at least one processor (e.g., a central processing unit) 205 coupled to memory elements 210 through a system bus 215 or other suitable circuitry. As such, system 125 can store program code within memory elements 210. Processor 205 executes the program code accessed from memory elements 210 via system bus 215. In one aspect, for example, system 125 is implemented as a computer or other programmable data processing apparatus that is suitable for storing and/or executing program code. It should be appreciated, however, that system 125 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. System 125 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 125. The I/O devices can be coupled to system 125 either directly or through intervening I/O controllers. One or more network adapters 245 also can be coupled to system 125 to enable system 125 to become coupled to other systems, computer systems, remote printers, and/or remote storage devices through intervening private or public networks. Modems, cable modems, and Ethernet cards are examples of different types of network adapters 245 that can be used with system 125.

As pictured in FIG. 2, memory elements 210 can store a lifecycle management application 250. Lifecycle management application 250, being implemented in the form of executable program code, can be executed by system 125 and, as such, is considered an integrated part of system 125. In executing lifecycle management application 250, system 125 is programmed to perform the various executable operations described within this specification. As such, it should be appreciated that lifecycle management application 250 and the various records described with reference to FIG. 1 and collectively referred to as the "historical development data" as stored within each of systems 105, 110, 115, and 120, are functional data structures that impart functionality when employed as part of system 125 or the other systems described herein.

In general, system 125 is configured to automatically identify whether a current change to a software system, which can be expressed as a development task, is similar to other changes, e.g., other development tasks, implemented in the past on the software system. System 125 conducts an analysis of the prior development tasks to further identify activities, e.g., as expressed through records maintained within the management systems, related to the prior development tasks that are also relevant to the current development task. System 125 can make an appropriate recommendation to the developer for the current development task.

Figure 3:
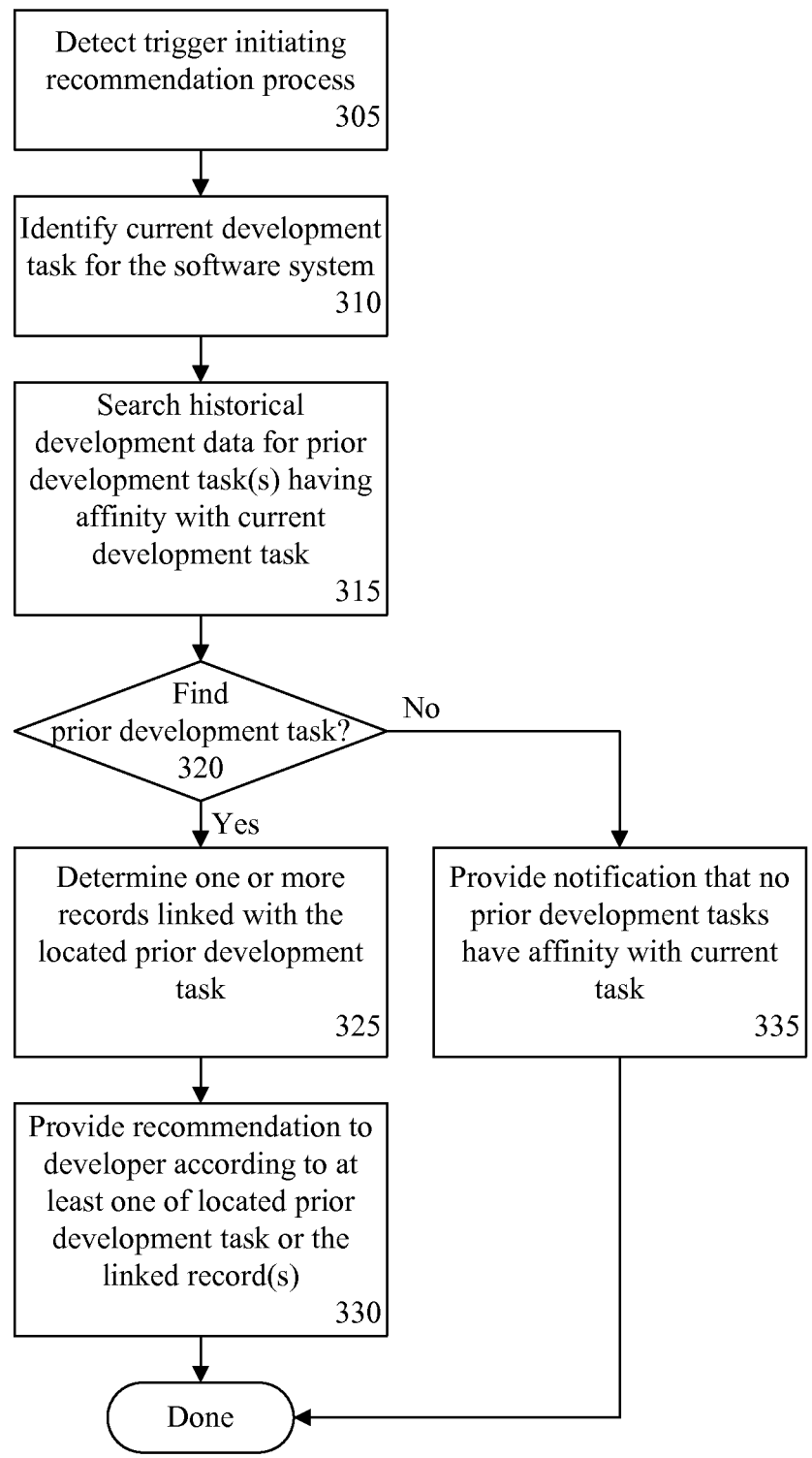
FIG. 3 is an example of a method of software lifecycle management.

FIG. 3 is an exemplary method 300 of software lifecycle management. Method 300 is implemented by system 125 as described with reference to FIGS. 1 and 2 of this specification. Accordingly, method 300 can begin in a state where the system, i.e., system 125, is operating within a computing environment as shown in FIG. 1 in which historical development data is stored within the various interconnected systems described.

In block 305, the system detects a trigger that initiates a recommendation process. One example of a trigger is a manual request received by the system from a developer. The developer, for example, can specify, as part of the request, a particular development task in the form of a particular change request or a particular change set. As such, the development task specifies one or more components of the software system that are to be modified.

In another example, the trigger is detected by the system by monitoring one or more other ones of the management systems. In illustration, the system can detect or be notified of the creation of a change request within the change request management system, which can be considered a trigger. In another illustration, the system can detect or be notified of one or more events occurring within the source code management system. For instance, events such as the creation of a branch or fork, the creation of a new version of one or more components, checking components (a change set) into the source code management system (the source code management system receiving a change set), checking one or more components out of the source code management system, etc., can be triggers.

As noted, the triggers described relate to detection of likely issues prior to the incorporation of a change set into a build of the software system. As such, the recommendations provide guidance that preempts the occurrence of any issues relating to incorporating potentially defective program code, e.g., source code, into the software system.

In block 310, the system identifies a current development task for the software system. The current development task is the particular activity or action to be performed as expressed or specified by a change request or a change set. The system, for example, can identify the development task from the trigger detected in block 305.

In block 315, the system searches the historical development data for the software system. The system searches the historical development data for a record, e.g., a prior record, having an affinity with the current development task. When the development task is defined by a change request, one or more specific components of the software system typically are specified. The system can search the historical development data for prior records relating to the components specified in the change request. For example, the system can search prior change requests within the change request management system for any change requests specifying one or more or all of the same components and/or attributes specified by the current change request. The various components and/or attributes of the current change request can be used as search and/or query parameters.

When the development task is defined by a change set, one or more specific components of the software system again are specified as members of the change set. The system can search the historical development data for records relating to the components specified in the change set. For example, the system can search the source code management system for prior change sets specifying one or more or all of the same components specified by the current change set.

In one aspect, the number of components specified in the current development task that match the components specified by the located, prior development tasks, whether change requests or change sets, can be used to determine whether the prior development task(s) have an affinity with the current development task. In one aspect, only those prior development tasks, e.g., change requests or change sets, having a minimum number of matching components with the current development task are said to have an affinity with the current development task.

In another aspect, an affinity can be determined, at least in part, according to whether particular lines of code (LOCs) and/or modules (e.g., routines or subroutines) of a component that were changed in a current development task match or correspond with changed LOCs and/or modules of a component specified by a prior development task. If a minimum number of matching components, LOCs, and/or modules are found, the current development task can be said to have an affinity with the prior development task. For example, a current development task may specify a same component as a prior development task, but have different modules therein that are modified in comparison to the prior development task. In that case, the current task may not have an affinity with the prior task since different modules of the component were modified in the prior development task compared to the current development task. When the current development task has at least a predetermined minimum number of LOCs, modules, or the like that are modified in common with changed LOCs, modules, or the like of a prior development task, then the prior development task is said to have an affinity with the current development task. The determination of whether the prior development task has an affinity can be made according to a percentage of modifications of the prior development task that match the modifications in the current development task, whether measured in terms of LOCs, modules, or the like.

In block 320, the system determines whether a prior development task having an affinity with the current development task has been located. If so, method 300 can continue to block 325. If not, method 300 can proceed to block 335. In block 335, the system provides a notification to the developer, e.g., a visual notice displayed upon a display, an auditory notice played over speakers, etc., that no prior development task was determined to have an affinity with the current task.

Continuing with block 325, when one or more prior development tasks are located that have an affinity with the current development task, the system locates or determines one or more other records that are linked with each of the prior development tasks found to have an affinity with the current development task. As noted with regard to FIG. 1, the records within the various management systems are linked across management systems. This allows a requirement to be linked with the corresponding change request, which is linked with the corresponding change set, which is further linked with the particular tests (e.g., tests, results, resolutions, etc.) that were performed or occurred in relation to the prior development task(s) found to have an affinity with the current development task. Accordingly, the system follows any established linkages between located development tasks (change sets or change requirements) with other records relating to documented activities.

In block 330, the system provides a recommendation to the developer according to the located prior development task, any records linked with the located prior development task, or both. In one aspect, the recommendation is a list of references such as links, to records located within the historical development data. In another aspect, the recommendation can provide more specific recommendations such as "in the prior 'X' development tasks involving changes to component 'Y', build errors occurred 'Z' percentage of the time." The recommendation can include specific tests to be performed, prior errors or issues encountered for the prior development tasks having an affinity with the current development task.

In further illustration, consider the case in which a developer is working on a change set of source code files. In the background, e.g., responsive to a trigger, the system performs a recommendation process as described. Through the analysis, the system identifies one or more other change sets which match the current change at a level of 85% using one or more of the various measures described. A further analysis of those change sets, e.g., via review of linked records, reveals that in 60% of the prior development tasks located in which the change sets were delivered to a development stream for the software system, the change sets were linked to a work item (error) caused by a build failure. The analysis further can reveal that the cause of the work item was the same compiler error.

Accordingly, the system issues a recommendation including a warning to the user. The warning can state that "A high percentage of the time this set of files was delivered, the resulting build failed with compiler error 'XYZ'. Please refer to the following work items listed below for details." In another example the system can issue a recommendation warning the developer that changing a specific requirement without a corresponding change in a specific set of test cases caused a downstream failure a high percentage of the time.

Figure 4:
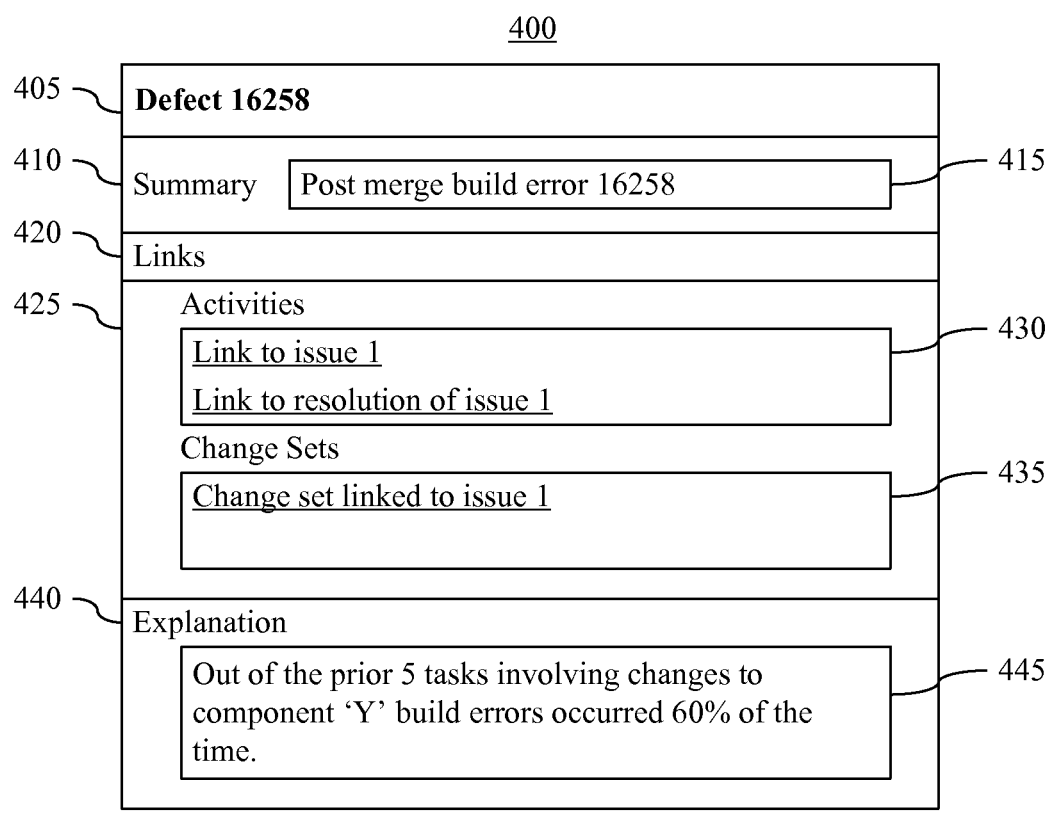
FIG. 4 is an example of a graphical user interface for a software lifecycle management system.

FIG. 4 is an example of a graphical user interface (GUI) 400 for a software lifecycle management system. GUI 400 is an exemplary interface that can be displayed to a developer upon a display screen, e.g., of a client system, through which the developer is working and/or interacting with the lifecycle management system. GUI 400 illustrates an example of an interface through which the system can deliver or provide a recommendation to a developer.

GUI 400 includes a block 405 indicating a type of defect located by a search for prior development tasks having an affinity with a current development task. Block 410 includes a brief summary of the defect in field 415. Block 420 begins a link section including block 425 in which records located by the search that are linked with the prior development task determined to have an affinity with the current development task are displayed.

As shown, block 425 provides information relating to linked records for the located task. In window 430, a link to a description of the issue as stored within a particular management system is provided. A link to the resolution of the issue, e.g., a work item and the corresponding resolution or fix, is also provided. In window 435, a link to the particular change set that caused the issue is provided. The developer can select a link to open the record to which the link points within the relevant management system.

Block 440 provides an explanation to the developer. In window 445, the lifecycle management system provides an explanation that is based upon the particular tasks that were located and found to have an affinity with the current task. For purposes of illustration, only a single defect is shown in FIG. 4. It should be appreciated, however, that blocks 405-425 can be repeated, for example, to provide information relating to the other 4 tasks referenced in window 445.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer hardware system including a lifecycle management system for managing a change request to a software system, comprising:
   receiving, by the lifecycle management system, a trigger;
   identifying, in response to receiving the trigger, a current development task which is a particular computer-implemented change to be performed on the software system;
   returning, based upon a search of historical development data, a record identifying a previously-implemented change on the same software system and having an affinity to the current development task; and
   implementing, based upon the record being returned, the current development task into the software system, wherein
   the historical development data is a collection of records of prior changes that were actually implemented on the software system.

2. The system of claim 1, wherein
   the trigger is a detection of an event, within a source code management system, indication a future modification to source code of the software system.

3. The system of claim 1, wherein
   the trigger includes the change request.

4. The system of claim 3, wherein
   the change request defines the current development task.

5. The system of claim 3, wherein
   the change request specifies a specific component of the software system, and
   the affinity is based upon the previously-implemented change have a component that matches the specific component.

6. The system of claim 3, wherein
   the change request specifies a proposed change set, and
   the affinity is based upon the previously-implemented change implementing a similar change set,
   the proposed and similar change sets each:
      identify a change to a component of the software system as compared to a different version of the component, and
      include modified source code for implementing the change to the component of the software system.

7. The system of claim 6, wherein
   the returning the record includes providing a measure of similarity between the proposed change set and the similar change set implemented by the previously-implemented change.

8. The system of claim 1, wherein
   the record includes:
      a link to a change set associated with the previously-implemented change,
      a link to test data associated with the previously-implemented change, and
      a link to a prior change request associated with the previously-implemented change.

9. The system of claim 1, wherein
   the affinity is based upon a minimum number of lines of code to be changed by the current development task matching lines of code changed by the previously-implemented change.

10. The system of claim 1, wherein
    the particular computer-implemented change is performed within a change set prior to the identifying, and the implementing the current development task includes incorporating the change set into a build of the software system.

11. A computer program product, comprising:
a computer-readable storage medium having program code stored therein,
the program code, which when executed by a computer hardware system including a lifecycle management system for managing a change request to a software system, causes the computer hardware system to perform:
  receiving, by the lifecycle management system, a trigger;
  identifying, in response to receiving the trigger, a current development task which is a particular computer-implemented change to be performed on the software system;
  returning, based upon a search of historical development data, a record identifying a previously-implemented change on the same software system and having an affinity to the current development task; and
  implementing, based upon the record being returned, the current development task into the software system, wherein
the historical development data is a collection of records of prior changes that were actually implemented on the software system.

12. The computer program product of claim 11, wherein the trigger is a detection of an event, within a source code management system, indication a future modification to source code of the software system.

13. The computer program product of claim 11, wherein the trigger includes the change request.

14. The computer program product of claim 13, wherein the change request defines the current development task.

15. The computer program product of claim 13, wherein the change request specifies a proposed change set, and the affinity is based upon the previously-implemented change implementing a similar change set,
the proposed and similar change sets each:
  identify a change to a component of the software system as compared to a different version of the component, and
  include modified source code for implementing the change to the component of the software system.

16. The computer program product of claim 13, wherein the change request specifies a proposed change set, and the affinity is based upon the previously-implemented change implementing a similar change set.

17. The computer program product of claim 16, wherein the returning the record includes providing a measure of similarity between the proposed change set and the similar change set implemented by the previously-implemented change.

18. The computer program product of claim 11, wherein the record includes:
  a link to a change set associated with the previously-implemented change,
  a link to test data associated with the previously-implemented change, and
  a link to a prior change request associated with the previously-implemented change.

19. The computer program product of claim 11, wherein the affinity is based upon a minimum number of lines of code to be changed by the current development task matching lines of code changed by the previously-implemented change.

20. The computer program product of claim 11, wherein the particular computer-implemented change is performed within a change set prior to the identifying, and
the implementing the current development task includes incorporating the change set into a build of the software system.

* * * * *